United States Patent Office 3,246,048
Patented Apr. 12, 1966

3,246,048
ORGANOSILOXANE-POLYETHER URETHANES
Loren A. Haluska, Midland, Mich., assignor to Dow Corning Corporation, Midland, Mich., a corporation of Michigan
No Drawing. Filed Sept. 14, 1962, Ser. No. 223,807
13 Claims. (Cl. 260—824)

This invention relates to moisture stable siloxane-polyether urethane copolymers, wherein the siloxanes are combined with the polyether urethane moieties through Si—C linkages.

Polyurethanes are a very recent class of materials that are finding increasing uses on account of their many unique and desirable properties. Early polyurethanes were made employing polyester intermediates. While these materials were highly useful, their moisture stability was poor. In order to improve the moisture resistance of this class of materials, polyurethanes were made from polyethers. This change turned out to be economically advantageous as well, and today most of the polyurethane materials are of the polyether type.

Organic polyether urethanes are made by reacting polyethers with organic isocyanates. The said polyethers are polymers containing repeating hydrocarbonoxy groups, the said polymers containing a plurality of hydroxyl groups therein. The organic isocyanates contain two or more isocyanate radicals per molecule. The reaction can be controlled to produce finished goods ranging from solid rubbers to foams, both rigid and flexible, to hard resinous materials such as for coating and protective finishes.

Despite the improved moisture resistance, or resistance to hydrolysis, of the polyethers over the polyesters, there is need to even further improve this said property for many applications. It has been proposed that the use of the naturally water-repellent organosilicon compounds would so add to the moisture resistance of the polyether urethanes. A physical mixture of organosilicon compounds with polyurethanes does provide some degree of improved moisture resistance, but the incompatible organosilicon compounds bleed out of the polyurethane readily, and any improved moisture resistance is lost. In addition, the exuding silicone is objectionable in many uses.

Organosilicon compounds have been modified to place reactive radicals thereon, as in British Patent 875,109, which reactive radicals are hydroxyalkoxyl radicals, and provides a means of copolymerizing the organosilicon compound with the polyether. However, the organosilicon compounds so used themselves contain linkages (namely SiOC linkages) which are unstable and are ruptured by the action of moisture.

It is an object of the present invention to provide an organosiloxane-polyether-urethane copolymer that has improved resistance to moisture.

It is a further object of this invention to provide a copolymer of a polyether and a silicone that does not contain moisture sensitive linkages in the organosilicon portion of the polymer.

Another object is to provide a polyether-urethane-containing chemically combined organosilicon portions therein.

Still another object of this invention is to provide a polyether-silicone urethane copolymer from which there is no bleed-out of silicone materials.

These and other objects will be apparent from the following description.

This invention relates to a copolymer made by reacting (1) at least 0.01 part by weight of a siloxane of the structure

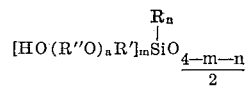

wherein R is selected from the group consisting of monovalent hydrocarbon radicals and monovalent halohydrocarbon radicals, R' and R" are each alkylene radicals of at least two carbon atoms, $a$ is a positive integer, $m$ has an average value of from greater than 0 to 1 inclusive and $n$ has an average value of from 0 to 3 inclusive, such that the sum of $m+n$ averages at least 1, (2) at least 5 parts by weight of a hydroxylated polyether, the combined parts by weight of (1) and (2) being 100, and (3) an organic isocyanate.

In siloxane (1) radical R can be any one or more monovalent hydrocarbon radicals such as alkyl such as methyl, ethyl, isopropyl, t-butyl and octadecyl; cycloalkyl such as cyclopentyl and cyclohexyl; unsaturated aliphatic such as vinyl, allyl, methallyl, butadienyl, and ethynyl; unsaturated cycloaliphatic such as cyclopentenyl and cyclohexadienyl; aryl such as phenyl, xenyl and naphthyl; alkaryl such as tolyl and aralkyl such as benzyl and phenethyl. Radical R can also be one or more monovalent halohydrocarbon radicals as above, such as chloromethyl, 3,3,3-trifluoropropyl, 4-bromo-2-butenyl; 2,3-dichlorocyclopentyl, chlorophenyl, dibromonaphthyl, etc. Preferred radicals include methyl, ethyl, vinyl, allyl, phenyl and 3,3,3-trifluoropropyl on account of their easy commercial availability.

Radicals R' and R" can each be the same or different alkylene radicals containing two or more carbon atoms therein, such as ethylene, propylene, isopropylene, butylene, —CH$_2$C(CH$_3$)$_2$—, —CH$_2$CH(CH$_3$)CH$_2$—, —(CH$_2$)$_{12}$—, etc. Preferred radicals on account of their easy commercial availability are those containing two to four carbon atoms therein.

The value of $a$ in siloxane (1) can be from 1 on up. There should be at least one (R"O) unit in the radical. More than one unit and up to several thousands can be present, although preferred values of $a$ are in the range such that the total sum of all $a$ values per molecule of siloxane (1) averages from 1 to about 500, as these materials will ordinarily be sufficiently fluid to be easily used in the preparation of the instant copolymer.

The value of $m$ in siloxane (1) is such that there is at least an average of one HO(R"O)$_a$R'— radical per molecule of siloxane (1) up to an average of one said radical per atom of silicon in siloxane (1). Because this radical is the functional radical in the preparation of the copolymer of this invention, the greater the number of these said radicals per molecule of siloxane (1) the more branched or cross-linked will be the said copolymer. When there is an average of but one said radical per molecule of siloxane (1), then this component of the invention will provide chain termination. When the average of the said radicals is two or more per molecule of siloxane (1), the siloxane portion of the instant copolymer will be present dispersed throughout the copolymer. When the value of $m$ is such that the average number of HO(R"O)$_a$R'— radicals per molecule of siloxane (1) is greater than 2, the resulting siloxane (1) with introduce branching and/or crosslinking into the resulting copolymer, the said branching and/or crosslinking being greater with increased value of $m$.

The value of $n$ can be from 0 to 3 inclusive, such that the sum of $m$ and $n$ averages at least 1. When the value of $n$ is 0, the siloxane (1) will be resinous in character. For values of $n$ from 1 to 2, the siloxane (1) will be linear to resinous depending also on the average value of $m$. When it is desired that siloxane (1) be essentially linear, the value of $n$ should be such that $m+n$ is about 2.

From a consideration of the permissible values of $m$ and $n$ in siloxane (1) it can be seen that siloxane (1) can have two types of siloxane units therein, represented by A. 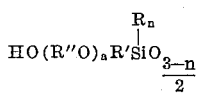

and

B. 

It can be readily seen that A must be present, while B may be present or may not.

Preparation of organosilicon compounds containing the HO(R″O)$_a$R′— radical is disclosed in U.S. Patent 2,846,458. One method is by reacting an unsaturated ether of the formula H(OR″)$_a$OD in which D is an alkenyl radical, with an organosilicon compound containing an SiH group. The reaction is usually carried out in the presence of a catalyst such as an organic peroxide, platinum or chloroplatinic acid. The reaction can be depicted as follows:

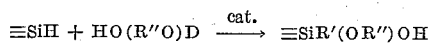

The organosilicon compounds employed in this reaction can be monomeric hydrolyzable silanes of the formula

in which Y is a hydrolyzable group such as halogen, alkoxy or the like. After these silanes have been reacted with the unsaturated ether they can then be hydrolyzed in the conventional manner to produce the siloxanes of this invention. Alternatively, the unsaturated ethers can be reacted with siloxanes containing the SiH group. In this case the siloxanes are prepared by a one-step process and no subsequent hydrolysis is needed.

It is preferable to block the hydroxyl group in the unsaturated ether with a triorganosiloxy group (for example, by reaction with a triorganohalosilane) prior to reaction with the organosilicon compound. This blocking prevents side reaction involving the silicon-bonded hydrogen or any silicon-bonded halogen. After addition of the unsaturated ether to the organosilicon compound has taken place the triorganosiloxy group can be removed by hydrolysis to regenerate the hydroxyl group.

An alternative method of preparing some of the compounds of this invention is that of reacting a hydroxyalkyl organosilicon compound of the formula

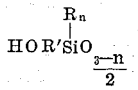

with an alkylene oxide at temperatures of 70 to 150° C. in the presence of catalysts such as H$_2$SO$_4$, stannic chloride and AlCl$_3$. Under these conditions reaction of the alkylene oxide with the hydroxyl of the hydroxyalkyl takes place to produce a hydroxyether of the formula

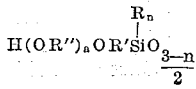

It can readily be seen that the composition of siloxane (1) is easily controlled by the choice of starting materials. In the most preferred method of preparing these materials, a polysiloxane is prepared containing therein silicon-bonded hydrogen radicals wherever it is desired to have the HO(R″O)$_a$R′— radical in siloxane (1), after which the said radical is added by the first method detailed above.

Siloxane (1) can also be prepared by hydrolysis and/or cohydrolysis of the appropriate hydrolyzable silanes.

The polyethers (2) used in the practice of this invention are polyhydric polyalkylene polyethers which contain an average of two or more hydroxyl radicals per molecule. Generally, the polyethers have molecular weights ranging from about 500 to about 6,000, but polyethers of higher or lower molecular weight can equally well be employed.

The polyethers (2) can be prepared, for example, by the polymerization of an alkylene oxide or by the condensation of an alkylene oxide with a polyhydric alcohol, as well known in the art. Examples of alkylene oxides include ethylene oxide, 1,2-propylene oxide, 1,2-butylene oxide and 1,3-propylene oxide. Examples of polyhydric alcohols include propylene glycol, glycerol, trimethylolethane, trimethylolpropane, 1,2,6-hexanetriol, pentaerythritol, dipentaerythritol and tripentaerythritol. This invention, however, is not restricted to the use of polyethers made by any particular method.

The organic isocyanate (3) of the copolymer of this invention can be any organic compound containing at least two isocyanate radicals per molecule. This includes aliphatic isocyanates, aromatic isocyanates, cycloaliphatic isocyanates, and organosilicon isocyanates as defined above. The said isocyanates can contain 2, 3, 4 or more isocyanate radicals per molecule. In addition, mixtures of two or more species, kinds, and/or types can be employed. Further, mono-isocyanates can be present and will enter into the reaction, but these alone will not function to affect the copolymer of the instant invention.

Examples of isocyanates that can be employed in the instant invention include diisocyanates such as toluene-2,4-diisocyanate, toluene-2,6-diisocyanate, metaphenylenediisocyanate, 4-chloro-1,3-phenylene diisocyanate, 4,4′-biphenyldiisocyanate, 1,5-naphthylene diisocyanate, 1,4-tetramethylene diisocyanate, 1,10-decamethylene diisocyanate, 1,4-cyclohexylene diisocyanate and 1,5-tetrahydronaphthylene diisocyanate; isocyanates containing three or more isocyanate radicals per molecule such as benzene triisocyanate, hexane-1,2,6-triisocyanate and

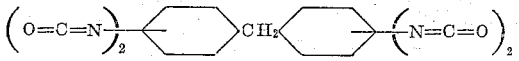

Further, the more recent non-volatile isocyanates such as are obtained by the reaction of an excess of a diisocyanate with a polyhydric alcohol can be employed. Examples of this last class of compounds include the reaction product of ethylene glycol and an excess of benzene diisocyanate, of the formula

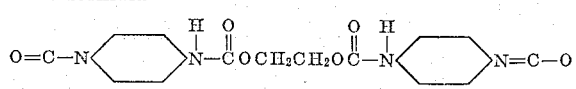

and the reaction product of pentaerythritol with an excess of toluene-2,4-diisocyanate, of the formula

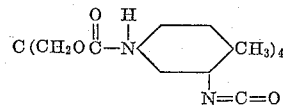

Examples of organosilicon isocyanates that can be employed in the instant invention include such as of the structure

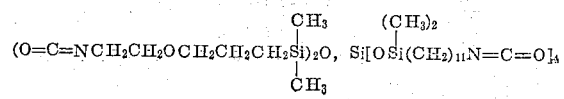

and other isocyanates as disclosed in U.S. Patent No. 3,170,891 entitled, "Silicone Isocyanates," by John L. Speier; isocyanates such as of the structure

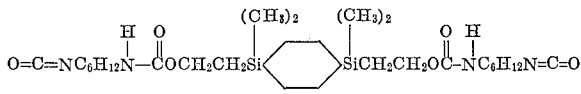

and

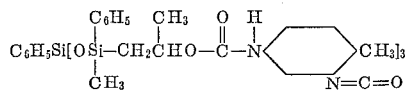

and others as disclosed in copending application Serial No. 182,663, filed March 26, 1962 now U.S. Patent No. 3,179,622; and isocyanates such as of the structure

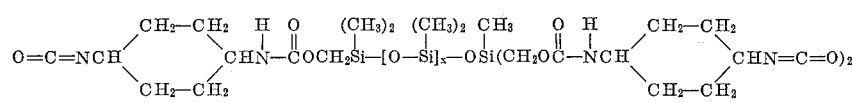

It is to be understood that the organic radicals attached to the silicon atoms of the above shown compositions, other than the functional isocyanate radicals, can be any radical normally found in organosilicon compounds. This is more fully illustrated in the above referred to copending applications. In short, any organosilicon isocyanate containing 2 or more isocyanate radicals per molecule can be employed, limited only in that the radicals containing the isocyanate function are attached to silicon via silicon to carbon linkages.

The quantity of organic isocyanates (3) to be used is dependent on (a) The quantity of hydroxyl radicals in components (1) and (2), (b) The presence or absence of other materials containing active hydrogen (hydrogen attached to oxygen, sulfur and nitrogen), (c) The functionality (with respect to isocyanate radicals) of isocyanate (3), (d) The molecular weight of isocyanate (3), (e) The desired degree of polymerization of the finished copolymer, and (f) The end use of the product.

All of these factors, while influencing the amount of isocyanate (3) to be used, are easily taken into account by one skilled in the art to determine the precise amount of isocyanate (3) required in any particular formulation.

The copolymer of this invention can be prepared by premixing components (1) and (2), then adding (3), or by simultaneous mixing components (1), (2) and (3). The reaction proceeds spontaneously upon mixing of the three components. Heating, while not necessary, can be empolyed if desired to speed the reaction. The reaction is exothermic, however, so that excessive heating could render the reaction difficult to control.

Alternatively, the copolymer of this invention can be prepared by premixing components (1) and (3), and then adding component (2), or there can be premixed components (2) and (3), and thereafter component (1) added thereto. In either of these last two methods, reaction between component (3) and either component (1) or component (2) will occur on mixing. Thus, while the preparation of the instant copolymer by these latter two methods will so produce the instant copolymer, the practice of either of these two methods may lead to copolymers having somewhat altered physical properties, both one from another and from a copolymer of like chemical composition made by either of the methods of the preceding paragraph. This fact can of course be used to advantage when practicing this invention.

If desired, catalysts that are normally used to accelerate the isocyanate reaction can be employed in the instant invention. Suitable catalysts include tertiary amines such as tributylamine and methylethyloctadecylamine; polyamines such as phenylenediamine, triethylenetetraamine and

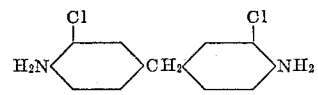

and organotin compounds such as stannous oleate and dibutyltin dilaurate. Combinations of two or more of the above catalysts can be employed, as well known in the art. The use or non-use of a catalyst or combination of catalysts is immaterial to the instant invention, however.

If desired, the reaction can be carried out in the presence of solvents that do not contain active hydrogen (hydrogen attached to oxygen, sulfur or nitrogen). Classes of such solvents include aliphatic and aromatic hydrocarbons, hydrocarbon ethers, esters, halogenated hydrocarbons, ethers and esters, polyethers and organic nitriles. This is not necessary, however, in that components (1) and (2) can be chosen to be fluids of sufficiently low viscosity that a solvent is unnecessary, and therefore may be wasteful, in that an extra step is necessary to remove the solvent. If it is desired, however, that the completed polymer be in solution, it is advantageous to employ the said solvent during the polymerization step.

In addition to the recited components, other materials can be present if desired. Substances commonly used as fillers in a polyurethane system can be employed here. These include organic fillers such as cork and wood flour, and inorganic fillers suhc as glass, powdered metals, metal oxides and carbonates, silica, asbestos, Teflon and carbon black.

If desired, the polymerization reaction can be accelerated by reagents commonly used in the polyurethane polymerization system, such as organic amines, organometallic salts, or combinations thereof. Reagents used to improve resistance to ageing and weathering can also be included, if desired.

The product of this invention can be a flexible, semirigid or rigid solid, a thin or thick fluid, a resin or a foam, the last ranging from flexible to rigid. For foam applications, it is of course necessary to add suitable foaming agents such as one or more of water, carbon dioxide, fluorocarbons, etc. The products of this invention have superior moisture resistance over similar materials that do not contain the silicone portion of the instant copolymer. In addition, the silicone portion does not itself have moisture sensitive SiOC linkages. Further, since the siloxane portion is copolymerized with the other components, the improved properties above are permanently a part of the instant composition.

Uses for the solid copolymers include such as shock mounts, rubber tires and similar applications, and they are especially useful where there is need for, in addition to the above advantages, resistance to swelling and deterioration toward hydrocarbons, solvents and oils. Foams can be used in cushioning, flotation and shock-absorbing applications. All forms of the instant composition are especially useful in applications where conventional polyether urethanes fail or are marginally serviceable on account of poor moisture resistance.

The following examples are illustrative only and should not be construed as limiting the invention which is properly delineated in the appended claims. In the examples the symbols Ph, Me and Et represent the phenyl, methyl and ethyl radicals respectively.

Example 1

An emulsion was prepared of the following composition: 7.0 grams of a polyether of the formula

having a molecular weight of about 2,000, 7.68 grams of a polysiloxane ether of the average formula

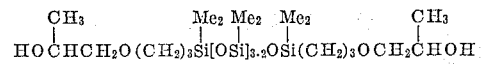

0.504 gram of a mixture containing 19.4 percent by weight of triethylene diamine and 80.6 percent by weight of water, and 0.2 gram of a surfactant of the structure

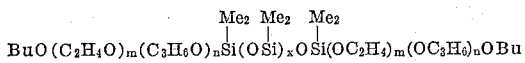

in which $x$ has an average value of about 30 and the propylene oxide and ethyleneoxide units are about equal in weight ratio.

The above composition formed the said emulsion with ease merely upon stirring. With vigorous stirring there was then added 5.21 grams of toluene diisocyanate, and the mixture was allowed to foam and cure. A good, uniform, flexible foam was obtained which did not bleed out siloxane materials on standing.

Example 2

A copolymer containing 50 mol percent PhMeSiO units and 50 mol percent MeHSiO units having a degree of polmerization of about 20 was reacted with an excess of allyloxy ethanol. The product was a copolymer containing 50 mol percent PhMeSiO units and 50 mol percent units of the structure

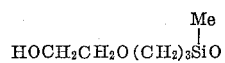

having a degree of polymerization of about 20.

The following materials were mixed in a container using a high speed stirrer: 10 grams of a polyether of the structure

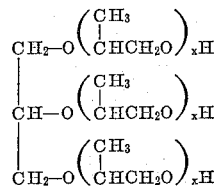

having a molecular weight of 3,000, 10 grams of the siloxane described above, 0.24 gram of the surfactant of Example 1, 0.64 gram of water, and 0.1 gram of a 50–50 volume mixture of stannous octoate and triethylamine. To the rapidly stirred mixture were added 7.31 grams of toluene diisocyanate. The resulting reaction produced a stable, uniform foam.

Example 3

A siloxanepolyether copolymer is formed when a mixture comprising 5 parts of polysiloxane ether of the structure

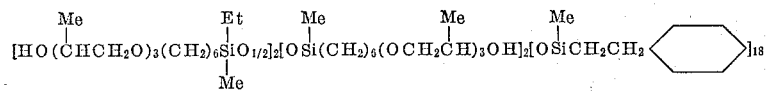

and 95 parts of a polyether of the structure

is reacted with an organic isocyanate of the structure

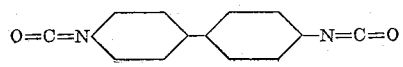

Example 4

When any of the following isocyanates are substituted for the isocyanate of Example 3, similar results are obtained.
 (a) Benzene triisocyanate,
 (b) 1,6-hexylene diisocyanate,

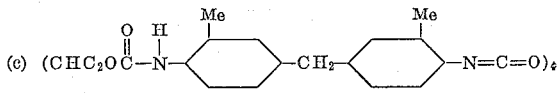

(d) Cyclohexylene-1,4-diisocyanate.

Example 5

When any of the mixtures shown below are substituted for the siloxane polyether mixture of Example 3, good copolymers are obtained.

A. 75 parts of a siloxane of the structure

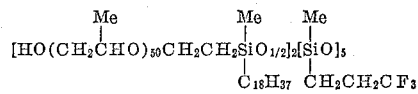

and 25 parts of the polyether of Example 2.

B. 20 parts of a siloxane of the structure

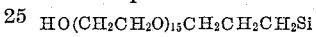

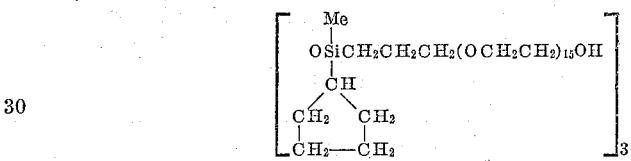

and 75 parts of a polyether of the structure

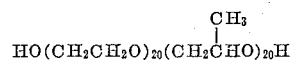

C. 5 parts of a siloxane of the structure

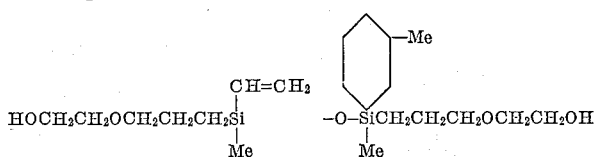

20 parts of a siloxane of the structure

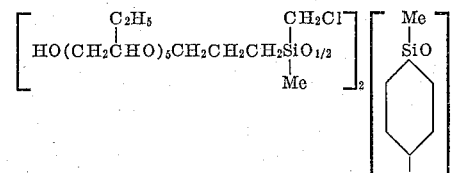

and 75 parts of a polyether of the structure

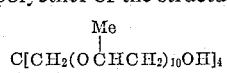

D. 0.1 part of a siloxane of the structure

89.9 parts of a polyether of the structure

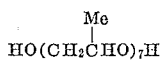

and 10 parts of the polyether of Example 2.

E. 3 parts of a siloxane of the structure

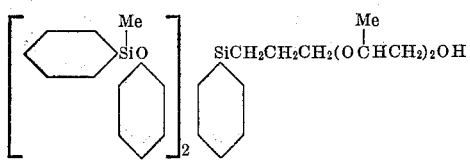

and 97 parts of a polyether of the structure

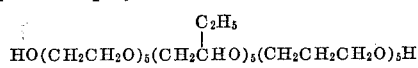

That which is claimed is:
1. A copolymer made by reacting
  (1) at least 0.01 part by weight of a siloxane of the structure

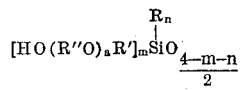

wherein R is selected from the group consisting of monovalent hydrocarbon radicals and monovalent halohydrocarbon radicals, R' and R" are each alkylene radicals of at least 2 carbon atoms, $a$ is a positive integer, $m$ has an average value of from greater than 0 to 1 inclusive and $n$ has an average value of from 0 to 3 inclusive, such that the sum of $m$ and $n$ averages at least 1,
  (2) at least 5 parts by weight of a hydroxylated polyether, the combined parts by weight of (1) and (2) being 100, and
  (3) an organic isocyanate containing therein at least two isocyanate radicals.
2. A copolymer made by reacting
  (1) at least 0.01 part by weight of a siloxane of the structure

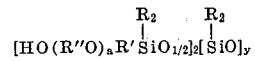

wherein R is selected from the group consisting of monovalent hydrocarbon radicals and monovalent halohydrocarbon radicals, R' and R" are each alkylene radicals of at least 2 carbon atoms, $a$ is a positive integer, $y$ is an integer including 0,
  (2) at least 5 parts of a hydroxylated polyether such that the combined parts by weight of (1) and (2) are 100, and
  (3) an organic compound containing therein at least 2 isocyanate radicals.
3. The copolymer of claim 1 wherein R is methyl and R' is propylene.
4. The copolymer of claim 2 wherein R is methyl and R' is propylene.
5. The copolymer of claim 1 wherein (3) is an aromatic isocyanate containing therein at least two isocyanate radicals.
6. The copolymer of claim 1 wherein (3) is an organosilicon isocyanate containing therein at least two isocyanate radicals.
7. The copolymer of claim 2 wherein (3) is an aromatic isocyanate containing therein at least two isocyanate radicals.
8. The copolymer of claim 2 wherein (3) is an organosilicon isocyanate containing therein at least two isocyanate radicals.
9. The copolymer of claim 5 wherein (3) is toluene diisocyanate.
10. The copolymer of claim 5 wherein (3) is

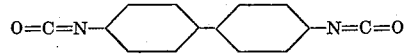

11. The copolymer of claim 7 wherein (3) is toluene diisocyanate.
12. The copolymer of claim 7 wherein (3) is benzene triisocyanate.
13. The copolymer of claim 4 wherein (3) is toluene diisocyanate.

References Cited by the Examiner

UNITED STATES PATENTS 2,846,458    8/1958    Haluska _____ 260—448.2

FOREIGN PATENTS

| 580,932 | 8/1959 | Canada. |
|---|---|---|
| 1,291,993 | 3/1962 | France. |
| 1,122,698 | 1/1962 | Germany. |
| 875,109 | 8/1961 | Great Britain. |
| 888,938 | 2/1962 | Great Britain. |

SAMUEL H. BLECH, *Primary Examiner.*

MURRAY TILLMAN, *Examiner.*